United States Patent [19]

Sato

[11] Patent Number: 4,774,609
[45] Date of Patent: Sep. 27, 1988

[54] DEVICE FOR A FLEXIBLE MAGNETIC DISK
[75] Inventor: Tadayoshi Sato, Kamakura, Japan
[73] Assignee: Mitsubishi Denki Kabushiki Kaisha, Tokyo, Japan
[21] Appl. No.: 853,190
[22] Filed: Apr. 17, 1986
[30] Foreign Application Priority Data Apr. 18, 1985 [JP] Japan .................................. 60-81388

[51] Int. Cl.[4] .......................... G11B 5/016; G11B 3/62
[52] U.S. Cl. ........................................ 360/99; 369/270
[58] Field of Search ................... 360/99, 97, 86, 133; 369/270-271

[56] References Cited

U.S. PATENT DOCUMENTS 4,403,319  9/1983  Adamek et al. ...................... 360/99
4,420,830  12/1983  Green ................................... 360/99
4,575,837  3/1986  Okita ................................... 369/270

Primary Examiner—John H. Wolff
Assistant Examiner—David J. Severin
Attorney, Agent, or Firm—Oblon, Fisher, Spivak, McClelland & Maier

[57] ABSTRACT

A device for a flexible magnetid disk comprises a motor, a spindle directly connected to the motor, and a cup member to be mounted on the spindle to support under a pressure a flexible disk, wherein an annular rib is formed in either one of the spindle and the cup member at a position corresponding to the fitting part of the center hole of the flexible disk and an undercut portion formed in the other at a position opposing the annular rib.

1 Claim, 3 Drawing Sheets

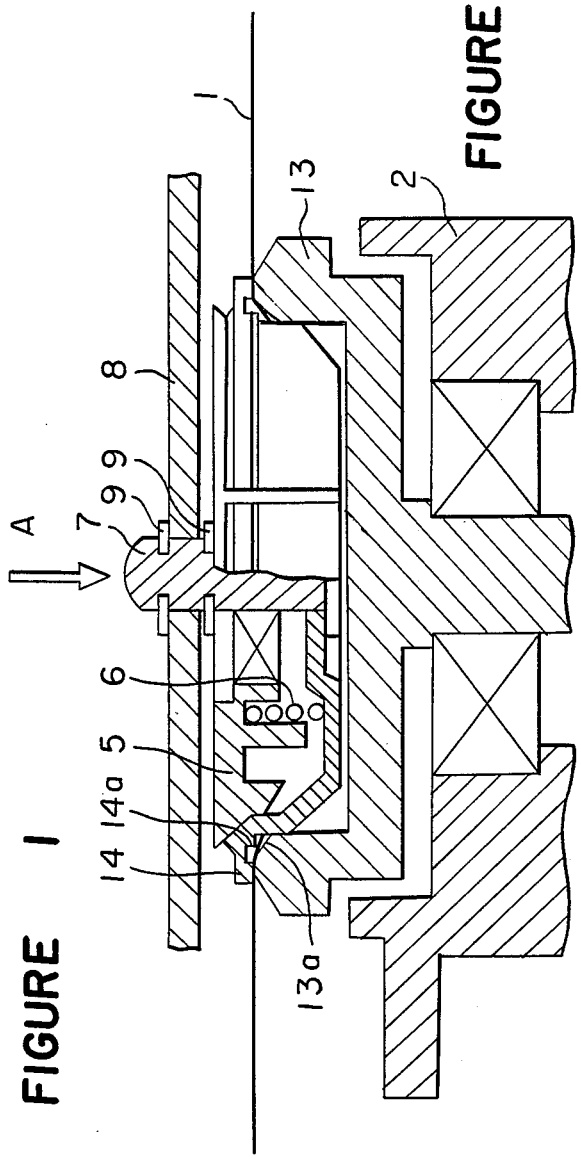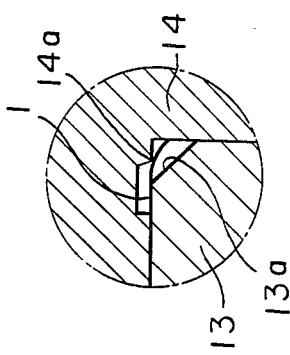

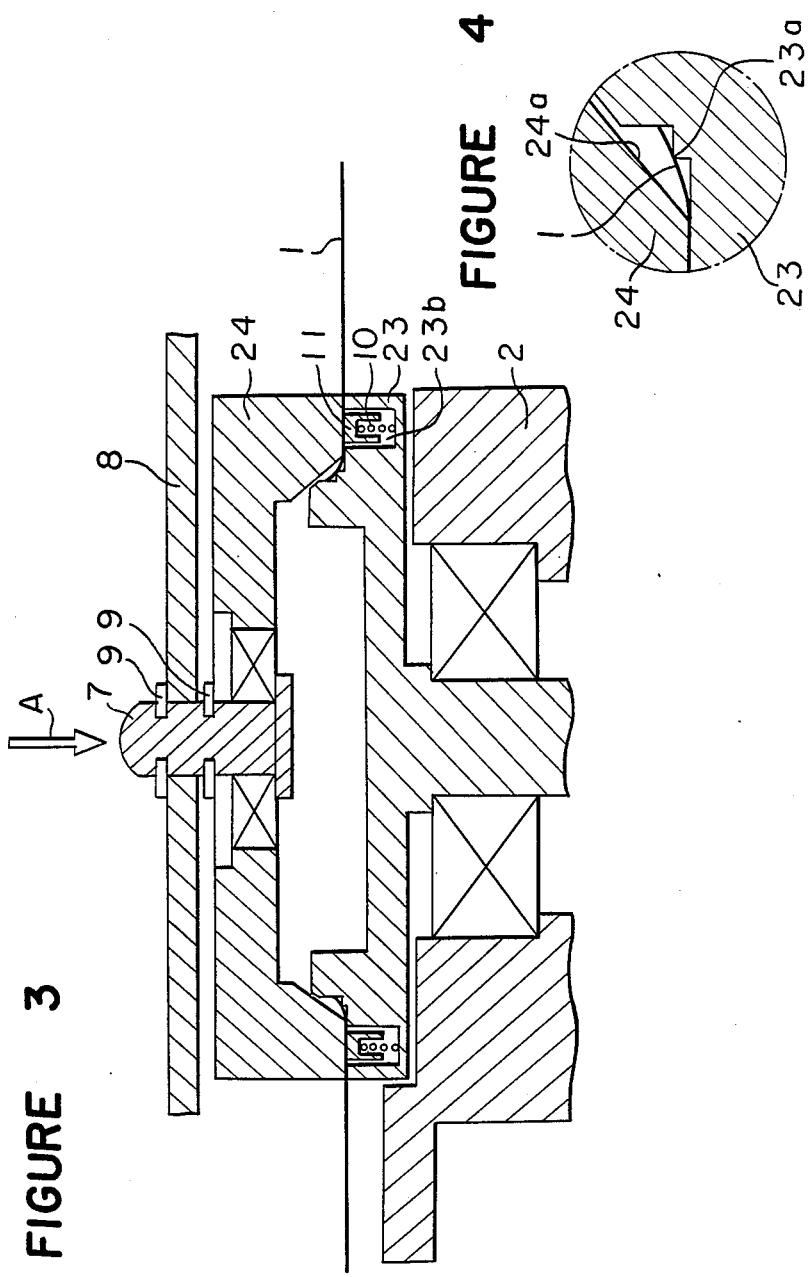

DEVICE FOR A FLEXIBLE MAGNETIC DISK

BACKGROUND OF THE INVENTION

1. Field of the Invention

The present invention relates to a device for a flexible magnetic disk. More particularly, it relates such a device which clamps a flexible disk in association with a spindle connected to a motor by means of a cup member.

2. Description of the Prior Art

FIG. 5 shows a conventional device for a flexible magnetic disk. A spindle 3 is directly connected to a motor 2 and a flexible disk 1 is pressed to the spindle 3 by a cup member 4 whereby the flexible disk 1 is rotated. The cup member 4 is exactly pressed to the spindle 3 by an auxiliary cup member 5 such that cooperating annular surfaces of the spindle 3 and the cup member 4 can clamp the disk 1 with a cylindical portion of the cup member 4 fitted in the central aperture of the disk. The cup members 4, 5 are brought to a correct positions by a coil spring 6 and are connected to a shaft pin 7. The shaft pin 7 is supported by a bridge base 8 by means of E-type rings 9.

In the device for the flexible magnetic disk having the above-mentioned construction, a flexible disk 1 having both surfaces of polyester film coated with magnetic powder is mounted on the spindle 3. When a door attached to the device is closed, the cup members 4, 5 fitted to the bridge base 8 which is connected to the door descend in the arrow mark direction A to be pressed to the spindle 3; thus the flexible disk 1 is clamped at a correct position.

In the conventional device, when the flexible disk 1 clamped by the cup member 4 and the spindle 3 is rotated, there takes place the phenomenon of an eccentric rotation or an undulating rotation of the flexible disk due to permissible error of the inner diameter of the central aperture, thereby damaging accuracy in writing-in and reading-out of information.

SUMMARY OF THE INVENTION

It is an object of the present invention to eliminate the disadvantage of the conventional device and to provide a device for a flexible magnetic disk which accommodates variances in the dimension of the center hole formed in a flexible disk and which rotates the disk without the phenomenon of eccentric clamping and/or an undulating rotation.

The foregoing and other objects of the present invention have been attained by providing a device for clamping a flexible magnetic disk having a central aperture, in which a spindle which is rotatably driven by a motor, and a cup member, are relatively positioned such that cooperating annular surfaces thereof can clamp the disk with a portion of either the spindle or the cup member fitted in the central aperture. Either the spindle or the cup member forms an undercut portion extending away from the plane of the disk at a radially innermost position of the disk, the radially innermost position also being radially within the cooperating surfaces. The other one of the spindle and the cup member forms an annular rib defining a step like annular projection projecting toward the undercut portion at a radial position corresponding to that of the undercut portion, the undercut portion and the rib cooperating to define an annular volume. The central aperature has a diameter small than that of the portion of the spindle or cup member fitted therein, so that a radially innermost portion of the disk can freely distort out of the plane thereof.

BRIEF DESCRIPTION OF THE DRAWINGS

FIG. 1 is a cross-sectional view of an important part of an embodiment of the device for a flexible magnetic disk according to the present invention;

FIG. 2 is an enlarged cross-sectional view of an important part in FIG. 1;

FIG. 3 is a cross-sectional view of an important part of the device for a flexible magnetic disk of the present invention;

FIG. 4 is an enlarged cross-sectional view of an important part in FIG. 3; and

DETAILED DESCRIPTION OF THE PREFERRED EMBODIMENTS

Figure 5:
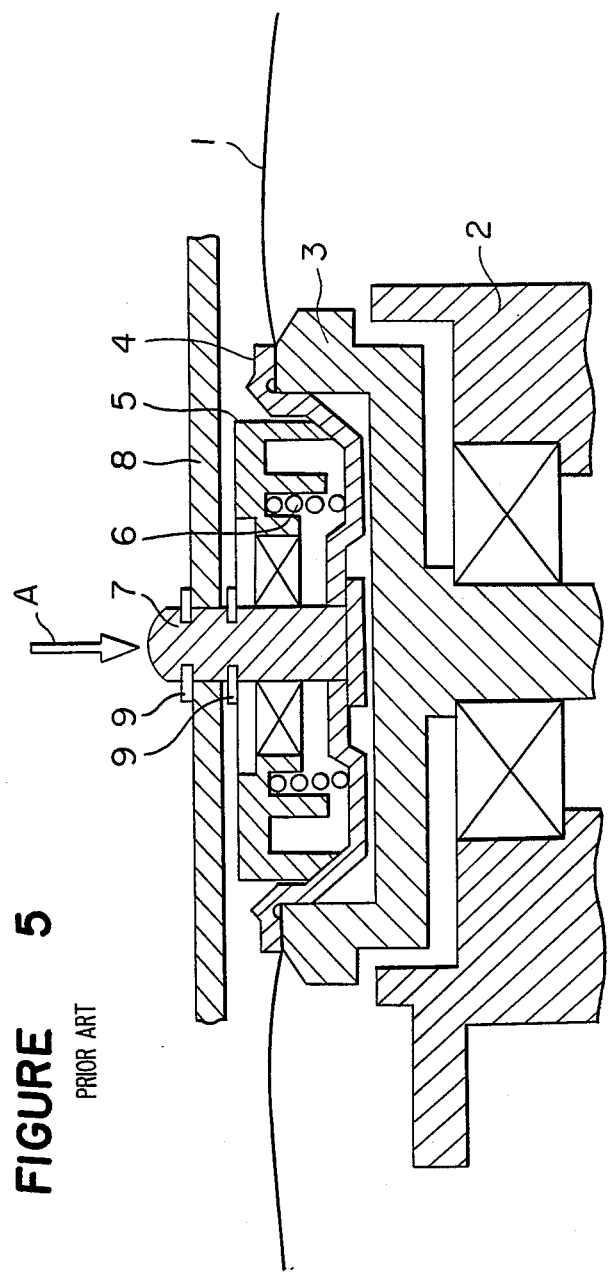
FIG. 5 is a cros-sectional view of an important part of a conventional device for a flexible magnetic disk.

Preferred embodiments of the present invention will be described with reference to the drawings.

FIGS. 1 and 2 show the first embodiment of the present invention. In FIGS. 1 and 2, the same reference numerals as in FIG. 5 designate the same or corresponding parts and description is, therefore, omitted.

An annular projection 14a as a shoulder or a stepped portion in cross-section is formed in a cup member 14 at a radial position corresponding to the fitting part of the center hole of the flexible disk 1. A spindle 13 is provided with an undercut portion 13a which is formed by chamfering the inner part of the annular edge extending upwardly of the spindle 13 and the plane of the disk at the radial position of the annular projection, so as to oppose the annular projection 14a. The annular projection 14a and the undercut portion 13a provide an annular volume for escaping to prevent corrugating of the flexible disk 1 when close-fitting of the flexible disk 1 and the cup member 14 is established.

With the above-mentioned construction of the device of the present invention, when the flexible disk 1 is put on the spindle 13 followed by closing the door attached to the device, the bridge base 8 connected to the door descend in the arrow mark direction A, and the cup member 14 fitted to the bridge base 8 is pushed to the spindle 13 directly connected to the motor whereby the flexible disk 1 is clamped at a correct position. In a relation of fitting the inner diameter of the spindle 13, the diameter of the center hole of the flexible disk 1, the cup member 14 and the auxiliary cup member 5 when the flexible disk 1 is clamped, dimensions of these elements are so determined as to provide "close-fit" function to the flexible disk 1 i.e., the inner diameter of the disk is smaller than that of the portion of the cup member fitted therein. In this case, the annular projection 14a is formed in the cup member 14 at a position near the fitting part of the center hole of the flexible disk 1 and the undercut portion 13a is formed by chamfering the spindle 13 to thereby eliminate the eccentric clamping or the undulating rotation which is caused by the "close-fit". Accordingly, the inner peripheral portion of the center hole of the flexible disk 1 is curved without difficulty whereby the eccentric clamping and the undulating rotation can be certainly eliminated.

FIGS. 3 and 4 show another embodiment of the present invention.

A spindle generally comprises a circular plate, an annular member formed integrally with the upper surface of the circular plate and a shaft extending from the lower surface. A cup member 24 generally comprises a circular plate and an annular projection extending downwardly from its outer edge portion, a free end of which is brought into contact with the flat portion of the outer circumferential part of the upper surface of spindle 23 when the bridge base 8 descends. A step-like annular projection 23a is formed in the spindle 23 at a position corresponding to the fitting part of the flexible disk 1. On the other hand, an undercut portion 24a is formed in the cup member 24 so as to correspond the annular projection 23a. Recesses 23b are formed in the outer peripheral portion of the spindle 23, and a plurality of push-up members 11 are received in the recesses 23b. Between the bottom of each of the recess 23b and each of the push-up members 11, a coil spring 10 is interposed. With the annular projection 23a and the undercut portion 24a, there is obtainable a space for escaping and a support for the flexible disk 1 in order to prevent corrugating of the flexible disk 1 when close-fitting of the flexible disk 1 and the spindle 13 is established.

The push-up members 11 facilitate discharge of the flexible disk 1 from the spindle 23 by means of the coil spring 10.

As described above, in the present invention, an annular projection and an undercut portion are formed in a cup member and a spindle at positions corresponding to the fitting part of the center hole of a flexible disk. Accordingly, eccentric clamping and an undulating rotation of the flexible disk which may occur due to scattering of the inner diameter of the center hole of the flexible disk can be eliminated and improves accuracy in operation of the device.

What is claimed is:

1. A device for clamping a flexible magnetic disk having a central aperture, comprising:
   a motor;
   a spindle rotatably driven by said motor; and
   a cup member positionable relative to said spindle such that cooperating annular surfaces of said spindle and said cup member can clamp said disk with a cylindrical portion of one of said spindle and cup member fitted in said central aperture, wherein:
   (a) one of said spindle and said cup member forms an undercut portion extending away from the plane of the disk, at a radially innermost portion of said disk which is radially within said cooperating surfaces,
   (b) the other of said spindle and said cup member forms an annular rib defining a step-like annular projection projecting towards said undercut portion, said undercut portion and said rib cooperating to define an annular volume, and
   (c) said central aperture has a diameter smaller than said portion of said one of said spindle and cup member fitted therein, whereby the disk, at said radially innermost portion thereof, can freely distort out of the plane thereof, and whereby said rib engages an intermediate segment of said radially innermost portion of said disk spaced from said central aperture innermost portion.

* * * * *